Figures 1, 2:
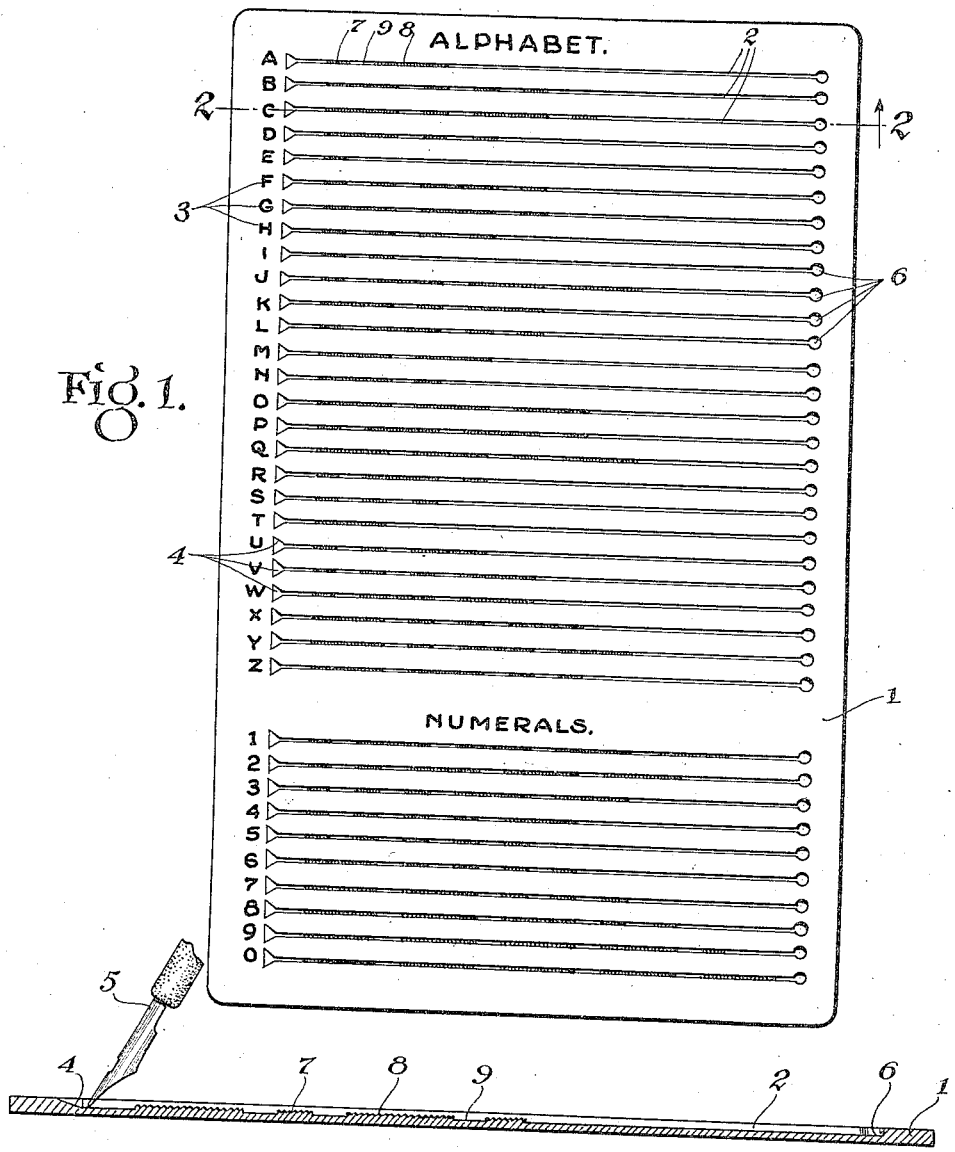

Aug. 21, 1923.

O. F. VOGT 1,465,699

EDUCATIONAL APPLIANCE

Filed March 17, 1923

Patented Aug. 21, 1923.

1,465,699

UNITED STATES PATENT OFFICE.

OTTO F. VOGT, OF WASHINGTON, DISTRICT OF COLUMBIA.

EDUCATIONAL APPLIANCE.

Application filed March 17, 1923. Serial No. 625,826.

*To all whom it may concern:*

Be it known that OTTO F. VOGT, a citizen of the United States, residing at Washington, D. C., has invented certain new and useful Improvements in Educational Appliances, of which the following is a specification.

My invention relates broadly to improvements in educational appliances and especially to an appliance for the introduction of novices and students in signal code reception.

More particularly my invention relates to means adapted to produce a sound or combination of sounds, when operated by the student, which represent the various sound characters of a signal code, such as the Morse international, whereby to train the ear of the student to the correct sound of the characters used in telegraphic communication.

The primary object of my invention is to provide a portable appliance of this character which may be operated at will by the student, without the use of attachments, such as battery circuits, buzzers, etc., and which is capable of producing the correct sound characters of the signal code.

A further object of my invention is to provide a device for training the ear of students in signal code reception, having visible characters, such as letters of the alphabet, numerals, etc., and irregular portions adjacent each visible character, adapted, when operated by the student, to produce an audible character to correspond to the visible character.

A still further object of my invention is to produce an educational device of this character which will be simple and inexpensive in construction and positive and reliable in operation, all as will be hereinafter more fully described and claimed.

Referring now to the accompanying drawings which are made a part hereof and on which similar reference characters indicate similar parts:

Figure 1 is a plan view of my improved educational appliance, showing the relation of the visible characters to the grooves in which the corresponding audible signals are produced, and Fig. 2 is an enlarged cross section taken on line 2—2 of Fig. 1, showing the formation of one of the grooves.

In the drawings, the portions indicated as 1 represent a tablet or table, which may be formed of any approved material having the characteristics of celluloid, bakelite or metal. I prefer however to form the tablet 1 of celluloid, as this material may be had in any desired color or thickness and is light in weight, durable and readily worked to form the groove 2 in the surface thereof, in any desired manner.

In Fig. 1 of the drawing, I have shown a vertical row of visible characters 3, arranged adjacent one edge of the tablet 1. These visible characters 3 are here shown on the drawing as representing letters of the alphabet, and numerals from 1 to 10, but it will be understood that other visible characters, commonly used in telegraphic communication, may be substituted without departing from the spirit of my invention. Arranged adjacent to each of the visible characters 3 is an enlarged entrance 4 to a groove 2. The entrances 4 to the grooves 2 are preferably flared outwardly toward the visible characters 3, to assist the student in directing a stylus 5 into the entrance to a selected groove 2. Stops 6 are likewise formed at the other end of the grooves 2 to prevent the stylus from leaving a selected groove 2 after its pointed end has traversed the lower surface thereof. The advantages of the flared entrances 4, and stops 6, to the groove 2, will be apparent from the description of operation explained hereafter.

By reference to Fig. 1 and particularly to the enlarged cross section in Fig. 2, it will be noted that the bottom of the grooves 2 is roughened at intervals to represent dots 7 and dashes 8, the components of signal codes. These roughened portions 7 and 8 are preferably formed by corrugating the bottom of the grooves 2 at intervals, the corrugated portions 8 being three times as long as the correspondingly formed portions 7, the smooth spaces 9, between the corrugated portion, being of the same length as the roughened portion 7.

In operation the student places the tablet 1 face upward upon any hard surface and with a stylus 5, which may be any hard, sharp pointed instrument, such as for instance, the common writing pen, selects a character 3 from the vertical row which is visibly displayed near one edge of the tablet 1. He then moves the stylus 5 into the flared entrance 4, which directs the point of the stylus into the entrance to the groove 2, adjacent the selected visible character 3, and continues to move the stylus 5 rapidly through the groove 2 until its point strikes the stop 6, at the far end of the groove. It will be seen that during this operation the point of the stylus 5 is caused to traverse the roughened portions 7 and 8 and the intermediate smooth portions 9, in the groove 2, in rapid succession producing a combination of short and long sounds, which is the audible code signal corresponding to the visible character selected.

By means of my invention, the ear of the student is trained to recognize certain combinations of short and long sounds as representing the characters of the signal code which is visibly displayed on the face of the tablet, rather than, for instance, that A is dot, dash; B dash, three dots, etc., etc.

In telegraphic communication and particularly in wireless telegraphy, the student must learn to receive the signal characters in combinations of short and long "buzzes", rather than dots and dashes. It is particularly important therefore that the ear of the student be trained to quickly distinguish between the dots and dashes when received in this manner and my invention is particularly designed to accomplish this end.

Although I have shown and described a preferred construction for accomplishing the objects heretofore enumerated, it will be understood that various modifications may be made therein without departing from the spirit of my invention, as defined in the following claims.

What I claim is:

1. An educational appliance comprising, in combination with a stylus, a member so equipped as to co-operate with the stylus in the audible production of a character of a signal code, when the stylus is caused to traverse said member in a substantially straight path, substantially as described.

2. An educational appliance comprising, in combination with a stylus, a tablet formed with visible characters and irregular portions adjacent each visible character adapted to produce corresponding audible characters, when traversed by said stylus in a substantially straight path.

3. An educational appliance comprising, in combination with a stylus, a tablet formed with visible characters and a groove adjacent each of said visible characters each groove having distinctive groups of irregularities adapted to produce audible characters corresponding to said visible characters, when traversed by said stylus.

4. An article of manufacture comprising a tablet formed with a series of unrelated grooves each having disconnected terminals and each of said grooves being formed with different irregularities, whereby audible signals of different characters will be produced by the movement of a stylus through said grooves.

In testimony whereof I affix my signature.

OTTO F. VOGT.